(12) United States Patent
Lim et al.

(10) Patent No.: US 12,434,531 B2
(45) Date of Patent: Oct. 7, 2025

(54) STABILIZER BAR LINK

(71) Applicant: HYUNDAI MOBIS CO., LTD., Seoul (KR)

(72) Inventors: Dong Jin Lim, Yongin-si (KR); Won Kil Moon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/405,282

(22) Filed: Jan. 5, 2024

(65) Prior Publication Data

US 2024/0383305 A1     Nov. 21, 2024

(30) Foreign Application Priority Data

May 18, 2023   (KR) .................. 10-2023-0064438
May 18, 2023   (KR) .................. 10-2023-0064439

(51) Int. Cl.
  *B60G 21/055*   (2006.01)

(52) U.S. Cl.
  CPC .... *B60G 21/0551* (2013.01); *B60G 2204/422* (2013.01); *B60G 2206/81012* (2013.01); *B60G 2206/8109* (2013.01)

(58) Field of Classification Search
  CPC .......... B60G 21/0551; B60G 2204/422; B60G 2204/416; B60G 7/001

USPC .................................................. 280/124.107
  See application file for complete search history.

(56) References Cited

U.S. PATENT DOCUMENTS

| | | | |
|---|---|---|---|
| 5,615,967 A * | 4/1997 | Hellon | B29C 45/14336 403/56 |
| 6,398,446 B1 * | 6/2002 | Pazdirek | B60G 7/001 403/135 |
| 8,870,201 B2 * | 10/2014 | Kuroda | B29C 45/14008 280/93.511 |
| 9,920,788 B2 * | 3/2018 | Trotter | F16C 11/0623 |
| 10,220,666 B2 * | 3/2019 | Kuroda | B60G 21/055 |
| 10,336,154 B2 * | 7/2019 | Meabe Zabala | B60G 21/055 |
| 2007/0271793 A1 * | 11/2007 | Mellis | B22D 19/00 72/367.1 |
| 2008/0211202 A1 * | 9/2008 | Belding | B60G 21/055 164/91 |
| 2019/0291526 A1 * | 9/2019 | Kuroda | B60G 21/055 |

\* cited by examiner

*Primary Examiner* — Paul N Dickson
*Assistant Examiner* — Tiffany L Webb
(74) *Attorney, Agent, or Firm* — Novo TechIP International PLLC

(57) ABSTRACT

A stabilizer bar link includes a hollow rod, an insert part mounted inside the rod, and a socket into which the rod is inserted and mounted, the socket having an outer surface coupled to the rod.

6 Claims, 14 Drawing Sheets

STABILIZER BAR LINK

CROSS-REFERENCE TO RELATED APPLICATIONS

This application claims the benefit under 35 U.S.C. § 119(a) of priority to Korean Patent Application Nos. 10-2023-0064438 and 10-2023-0064439, filed on May 18, 2023 in the Korean Intellectual Property Office, the entire disclosure of which is incorporated herein by reference for all purposes.

TECHNICAL FIELD

Exemplary embodiments of the present disclosure relate to a stabilizer bar link, and more particularly, to a stabilizer bar link capable of improving connectivity and/or scalability between a socket and a rod.

BACKGROUND

A stabilizer bar link is used to suppress a relative displacement between left and right vehicle wheels by using rotational stiffness of a material. That is, the stabilizer bar link does not operate when the two vehicle wheels simultaneously move upward or downward. When the left and right wheels move in opposite directions (particularly a vehicle turns), the stabilizer bar link reduces a relative displacement between the left and right vehicle wheels while twisting, thereby stabilizing a vehicle posture and improving driving power and rotational force of the vehicle.

A socket and a link part of the stabilizer bar link are integrally manufactured through a joining process method such as forging or die-casting. With the technology for separately joining sockets and rods, the stabilizer bar links having various angles or lengths may be manufactured. However, the strength of junction portions tends to decrease in comparison with the integrated stabilizer bar link in the related art.

A swaging method in the related art for joining the rod and the socket has a problem in that whether the sufficient strength of the junction portion can be ensured is uncertain. In addition, in order to separately join the rod and the socket, it is necessary to ensure scalability between the rod and the socket. Therefore, there is a need to solve the problems.

SUMMARY

Various embodiments are directed to a stabilizer bar link capable of improving connectivity between a socket and a rod.

Various embodiments are also directed to a stabilizer bar link capable of improving scalability between a socket and a rod.

In an embodiment, a stabilizer bar link includes: a hollow rod; an insert part mounted inside the rod; and a socket into which the rod is inserted and mounted, the socket having an outer surface coupled to the rod.

The rod may include: a hollow rod body inserted into the socket; and a rod protrusion annularly protruding from an outer surface of an end of the rod body and coupled to the socket through plastic deformation.

The rod protrusion may be provided as a plurality of rod protrusions protruding from the outer surface of the end of the rod body.

The socket and the rod protrusion may be integrated by swaging processing.

The insert part may include: an insert body mounted inside the rod; and an insert stopper formed at an end of the insert body so as to be larger than an inner diameter of the rod.

The insert part may be made of a material having higher strength and hardness than a material of the rod.

The stabilizer bar link may further include: a bonding material applied onto an outer surface of the rod and bonded to the socket.

The rod and the socket may each be formed of a plastically deformable material.

In another embodiment, a stabilizer bar link includes: a hollow rod; an elastically deformable sealing part mounted inside the rod; and a socket inserted and mounted in the rod and configured to press the sealing part.

The rod may include: a rod body formed in a hollow shape and configured such that the socket is inserted into the rod body; and a rod stepped portion stepped on the rod body and having an inner surface on which the sealing part is mounted.

The socket may include: a socket body; and a socket insertion portion protruding from the socket body, inserted into the rod body, and configured to press the sealing part.

The socket insertion portion may include: a socket rod protruding from the socket body and inserted into the rod body; and a socket pressing portion protruding from an outer surface of the socket rod and configured to press the sealing part.

The socket insertion portion and the rod body may be integrated by being plastically deformed by swaging processing.

The rod and the socket may each be formed of a plastically deformable material.

The sealing part may be formed on an inner surface of the rod by injection molding.

According to the stabilizer bar link according to the present disclosure, the rod may be inserted and mounted in the socket, and the outer surface of the rod may be plastically deformed, thereby improving the connectivity between the socket and the rod.

According to the present disclosure, the insert part may be mounted inside the rod, which may prevent the rod from being excessively deformed when the rod and the socket are plastically deformed.

According to the present disclosure, the bonding material may be applied onto the outer surface of the rod, such that the rod and the socket may be kept in a securely coupled state.

According to the present disclosure, the elastically deformable sealing part is interposed between the socket and the rod, and the sealing part is elastically deformed by the socket, such that a clearance between the socket and the rod may be removed, thereby improving the sealability.

According to the present disclosure, the outer surface of the socket is stepped, and the inner surface of the rod is stepped, such that the occurrence of a clearance between the socket and the rod may be reduced.

DETAILED DESCRIPTION

Figure 1:
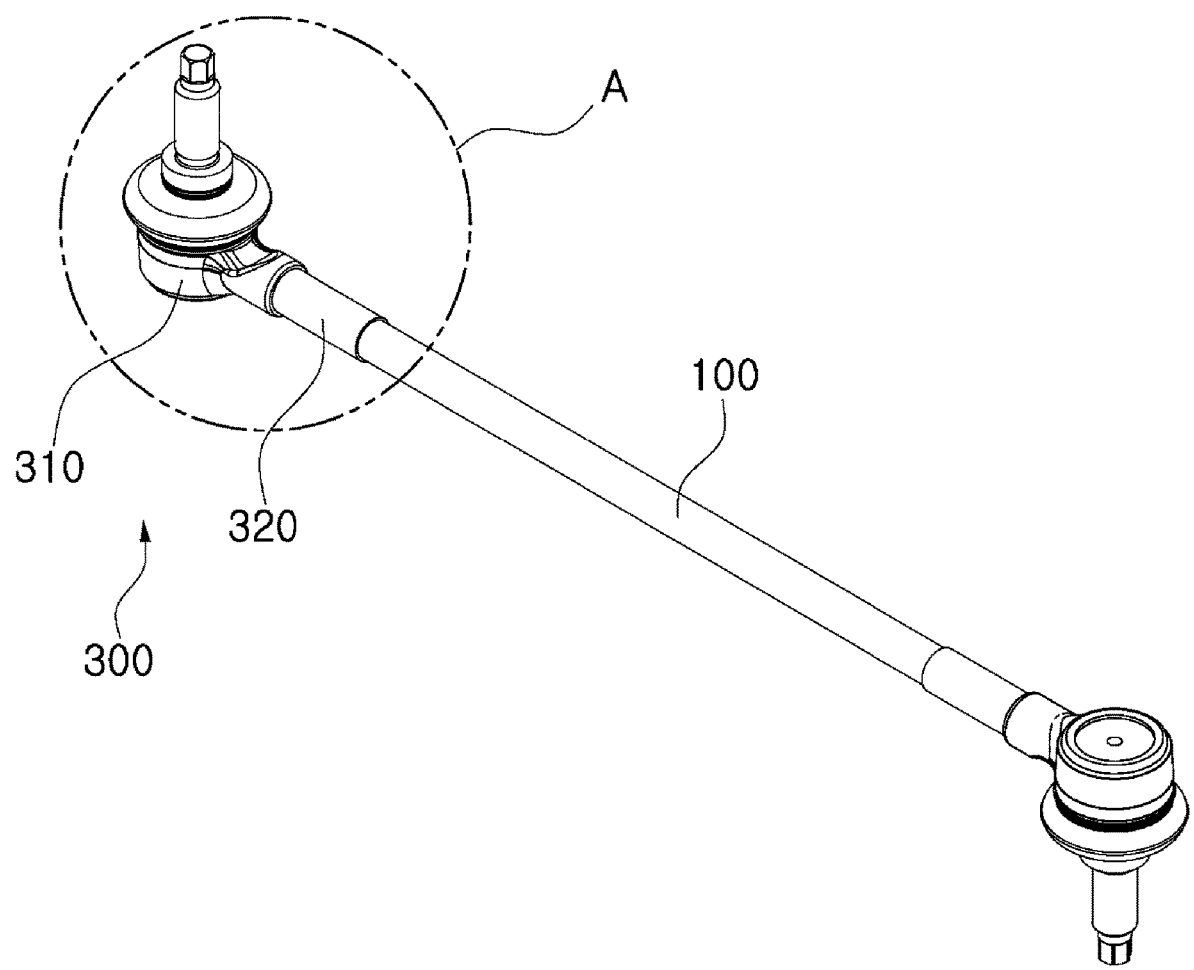
FIG. 1 is a perspective view schematically illustrating a state made before a rod and a socket of a stabilizer bar link according to a first embodiment of the present disclosure are swaged.

Hereinafter, a stabilizer bar link will be described below with reference to the accompanying drawings through various exemplary embodiments. Here, thicknesses of lines, sizes of constituent elements, or the like illustrated in the drawings, may be exaggerated for clarity and convenience of description.

In addition, the terms used below are defined in consideration of the functions thereof in the present disclosure and may vary depending on the intention of a user or an operator or a usual practice. Therefore, such terms should be defined based on the entire contents of the present specification.

Figure 2:
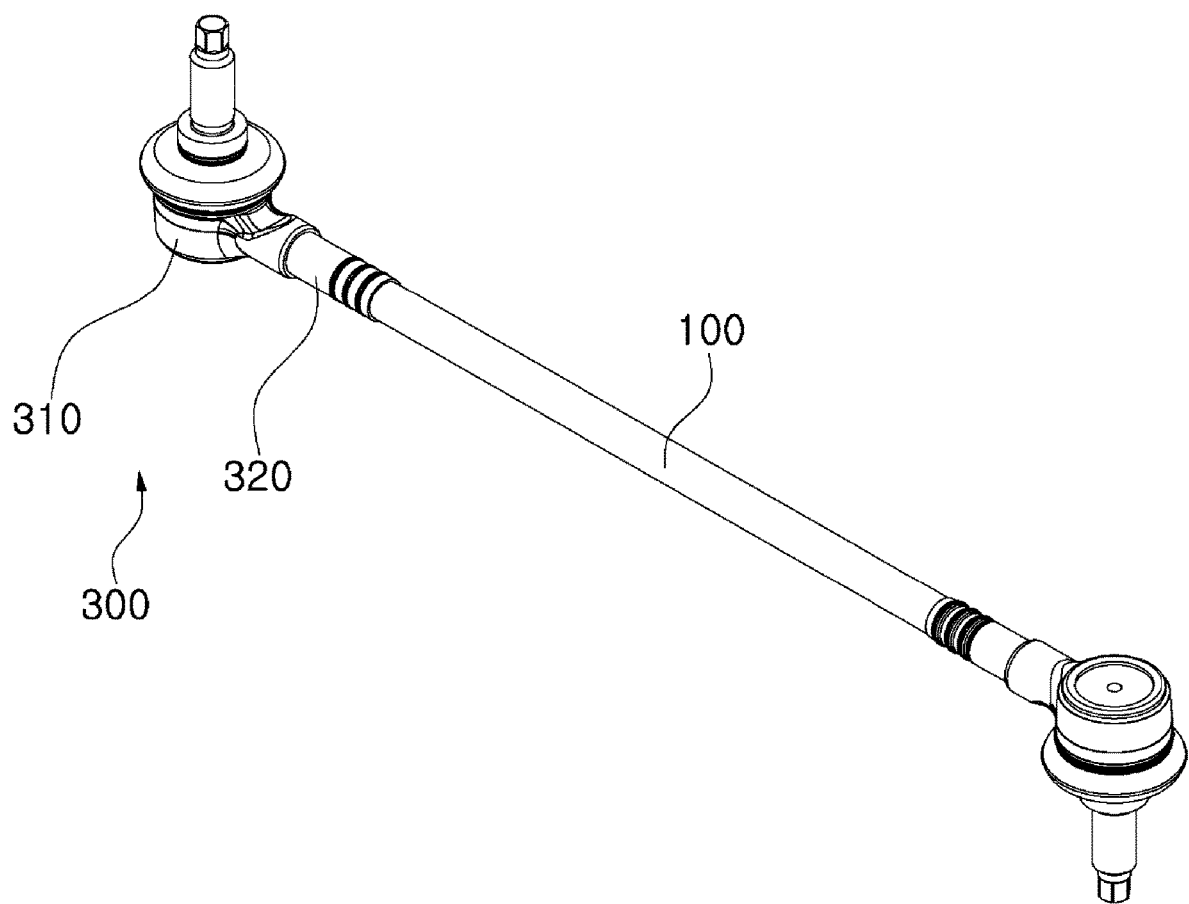
FIG. 2 is a perspective view schematically illustrating a state made after the rod and the socket of the stabilizer bar link according to the first embodiment of the present disclosure are swaged.
Figure 3:
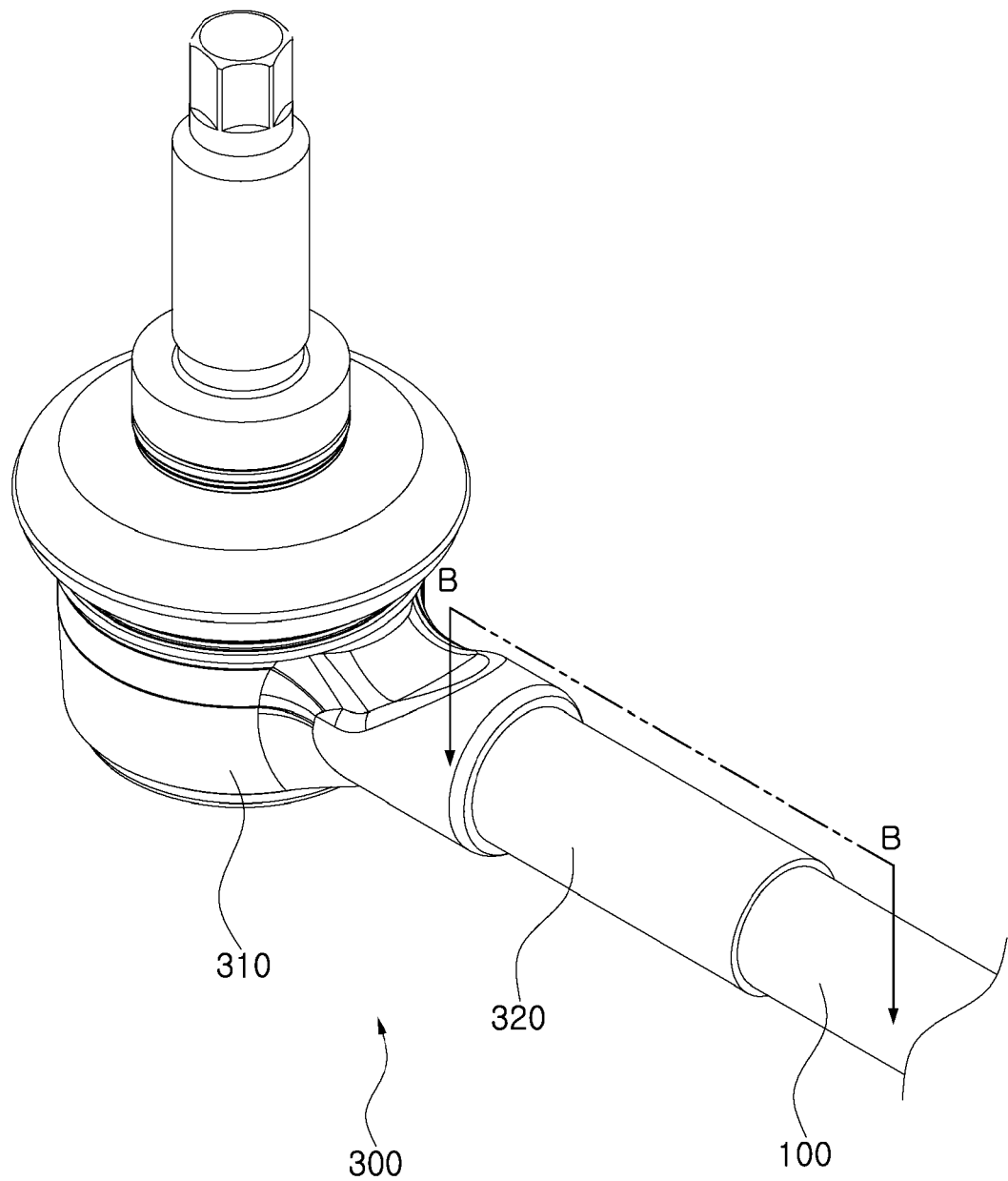
FIG. 3 is a partially enlarged perspective view schematically illustrating part "A" in FIG. 1.
Figure 4:
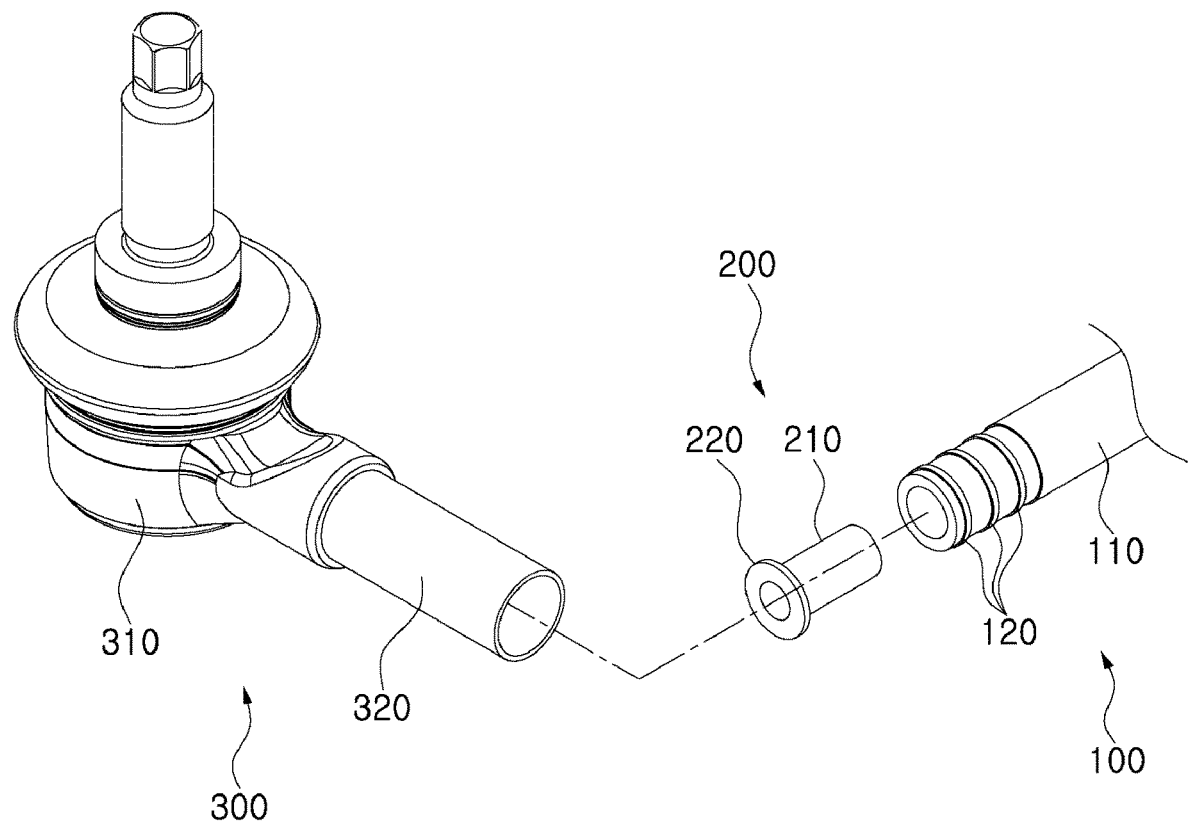
FIG. 4 is an assembled perspective view schematically illustrating a main configuration of the stabilizer bar link according to the first embodiment of the present disclosure.
Figure 5:
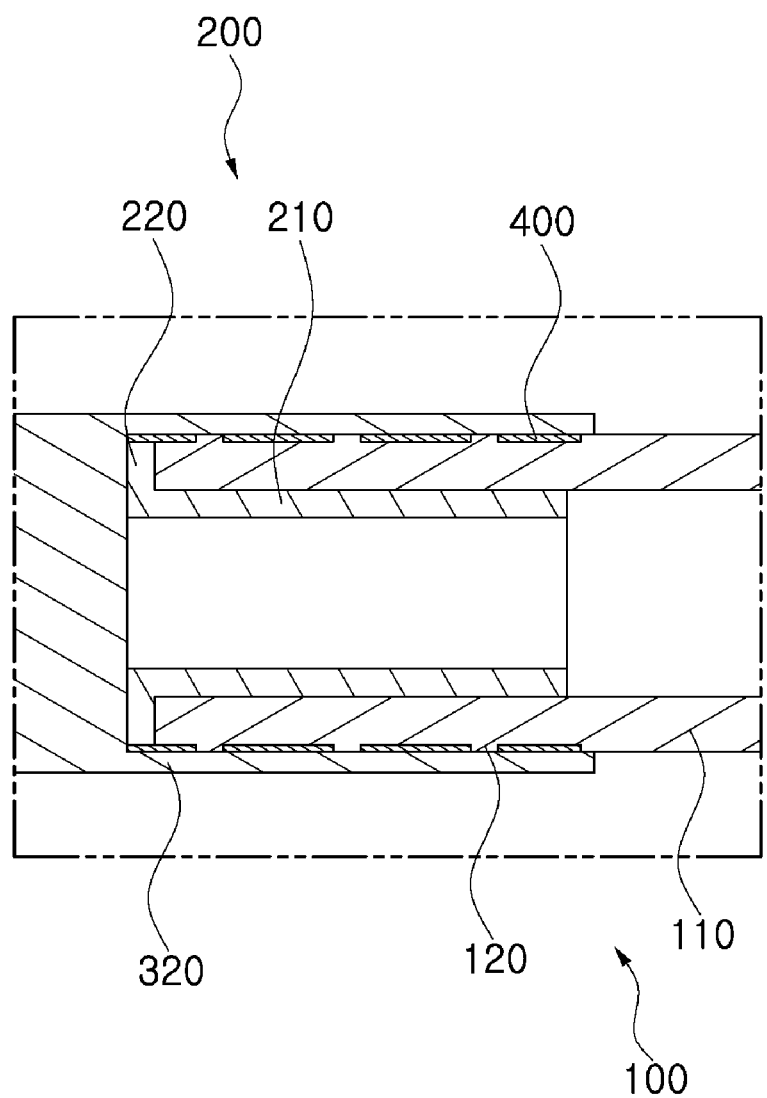
FIG. 5 is a cross-sectional view schematically illustrating a cross-section taken along line B-B in FIG. 3.
Figure 6:
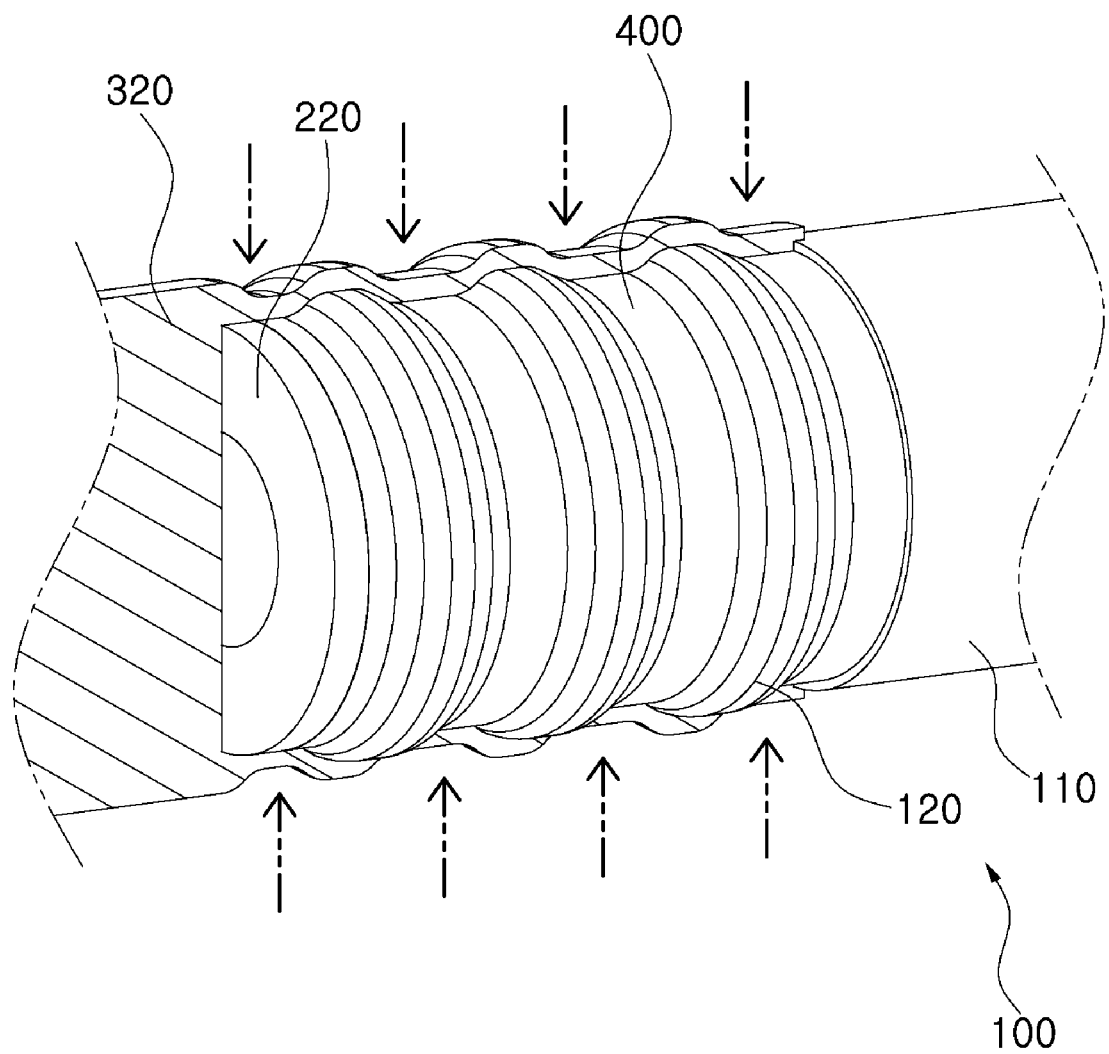
FIG. 6 is a partially cut-out cross-sectional perspective view schematically illustrating a swaged state of a main configuration of the stabilizer bar link according to the first embodiment of the present disclosure.
Figure 7:
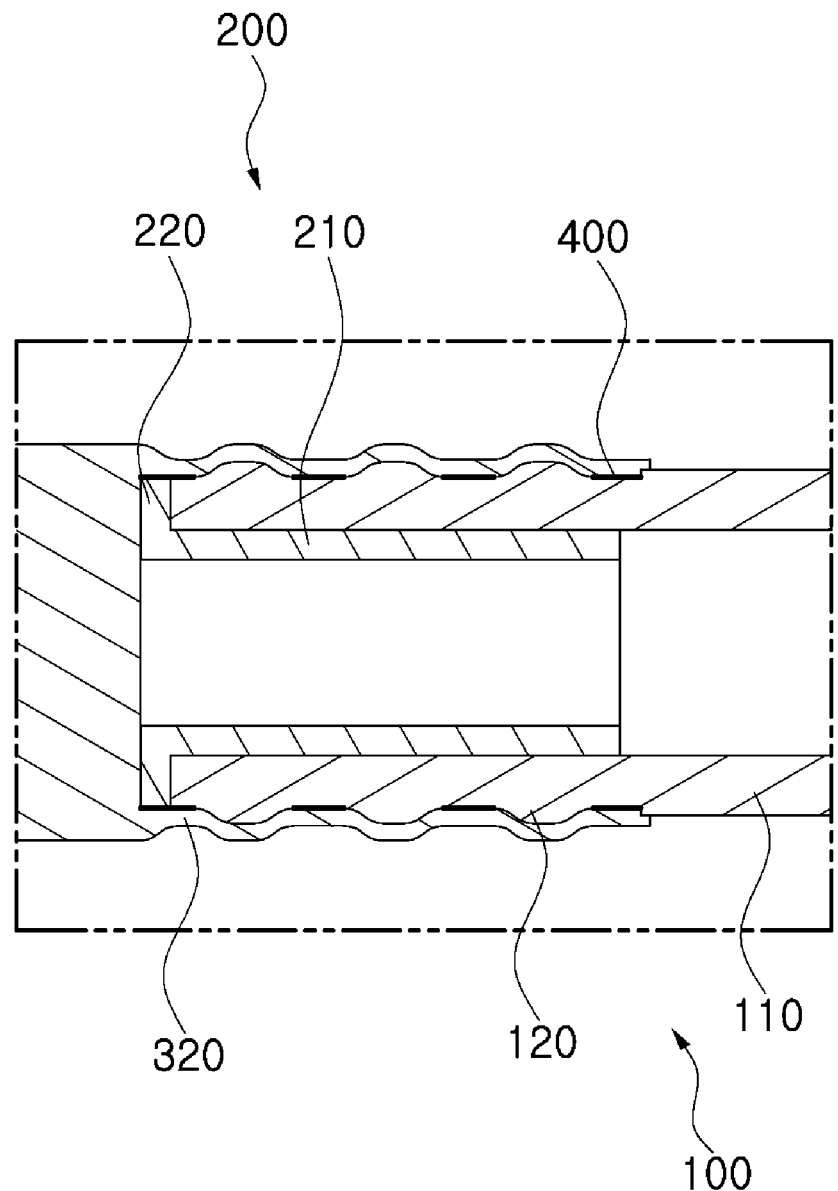
FIG. 7 is a cross-sectional view schematically illustrating the swaged state of the main configuration of the stabilizer bar link according to the first embodiment of the present disclosure.

FIG. 1 is a perspective view schematically illustrating a state made before a rod and a socket of a stabilizer bar link according to a first embodiment of the present disclosure are swaged, FIG. 2 is a perspective view schematically illustrating a state made after the rod and the socket of the stabilizer bar link according to the first embodiment of the present disclosure are swaged, FIG. 3 is a partially enlarged perspective view schematically illustrating part "A" in FIG. 1, FIG. 4 is an assembled perspective view schematically illustrating a main configuration of the stabilizer bar link according to the first embodiment of the present disclosure, FIG. 5 is a cross-sectional view schematically illustrating a cross-section taken along line B-B in FIG. 3, FIG. 6 is a partially cut-out cross-sectional perspective view schematically illustrating a swaged state of a main configuration of the stabilizer bar link according to the first embodiment of the present disclosure, and FIG. 7 is a cross-sectional view schematically illustrating the swaged state of the main configuration of the stabilizer bar link according to the first embodiment of the present disclosure.

With reference to FIGS. 1 to 7, the stabilizer bar link according to the first embodiment of the present disclosure may include a rod 100, an insert part 200, and sockets 300.

The rod 100 may be formed in a hollow pipe shape. With reference to FIGS. 1 and 2, the sockets 300 may be respectively mounted at two opposite ends of the rod 100. The rod 100 may include a rod body 110 and rod protrusions 120.

The rod body 110 may be formed in a hollow pipe shape inserted into the socket 300. The sockets 300 may be respectively mounted at two opposite ends of the rod body 110. The rod body 110 may be formed in a hollow shape, such that the durability of the rod body 110 may be improved when the weight remains the same.

The rod protrusion 120 may annularly protrude from an outer surface of the end of the rod body 110. The rod protrusion 120 may be coupled to the socket 300 by plastic deformation of the protrusion 120. When the rod protrusions 120 are pressed by a mechanism such as a swaging machine in a state in which the rod protrusions 120 are inserted into the socket 300, the rod protrusions 120 are plastically deformed by a swaging processing, such that the rod 100 and the socket 300 are integrated.

The rod 100 and the socket 300 may be formed in a wave shape through plastic deformation by swaging processing.

The plurality of rod protrusions 120 may protrude from the outer surface of the end of the rod body 110. The plurality of rod protrusions 120 may protrude from the end outer surface at preset intervals. The plurality of rod protrusions 120 may protrude from the end outer surface of the rod body 110, such that a section in which the rod protrusions 120 and the socket 300 are integrated by plastic deformation is formed to be wide. The rod protrusions 120 and the socket 300 may be plastically deformed, such that a securely coupled state may be maintained.

The insert part 200 may be mounted inside the hollow rod 100. The insert part 200 may be inserted and mounted inside the hollow rod body 110. The insert part 200 may include an insert body 210 and an insert stopper 220. The insert part 200 may be formed in a hollow pipe shape.

The insert body 210 may be mounted inside the rod 100. The insert body 210 may be formed in a hollow pipe shape. An outer diameter of the insert body 210 may be equal to or smaller than an inner diameter of the rod body 110. The insert body 210 may be inserted and mounted inside the rod body 110.

The insert stopper 220 may be formed at an end of the insert body 210 so as to be larger than an inner diameter of the rod 100. An outer diameter of the insert stopper 220 may be larger than the inner diameter of the rod body 110.

The insert stopper 220 may be formed at the end of the insert body 210 so as to be larger than the inner diameter of the rod body 110, such that the insert stopper 220 may prevent the insert body 210 from being excessively inserted into the rod body 110.

The outer diameter of the insert stopper 220 may be equal to an outer diameter of the rod body 110. The outer diameter of the insert stopper 220 may be equal to the outer diameter of the rod body 110, such that the insert stopper 220 may not protrude from the rod 100 inserted into the socket 300.

The insert part 200 may be made of a material having higher strength and hardness than a material of the rod 100. Because the insert part 200 is made of a material having higher strength and hardness than the material of the rod 100, excessive deformation of the rod 100 may be prevented when the rod 100, together with the socket 300, is plastically deformed by the swaging machine or the like.

In the present disclosure, the insert part 200 may include a steel material, and the rod 100 may include an aluminum material. The insert part 200 including the steel material may support the rod 100 in order to prevent the rod 100, which includes the aluminum material and is plastically deformed together with the socket 300, from being excessively deformed.

The rod 100 may be inserted and mounted in the socket 300, and an outer surface of the socket 300 may be coupled to the rod 100 by being plastically deformed. The socket 300 may be integrated with the rod 100 by being plastically deformed by being pressed by the mechanism such as the swaging machine.

The socket 300 may include a socket body 310 and a socket rod 320. The socket body 310 may have a rotatable ball stud, a bearing, and the like provided in an internal space thereof. Grease or the like may be applied between the ball stud and the bearing mounted in the socket body 310. The socket body 310 may be coupled, by means of a ball joint, to a knuckle, an upper arm, or a shock absorber coupled to a wheel of a vehicle.

The socket rod 320 may have a hollow shape mounted on the socket body 310. The rod 100 may be inserted and mounted inside the socket rod 320.

The socket rod 320, together with the rod protrusions 120, may be plastically deformed by swaging processing by being pressed by the mechanism such as the swaging machine, such that the rod 100 and the socket 300 may be integrated.

The stabilizer bar link according to the present disclosure may further include a bonding material 400. The bonding material 400 may be configured as a solid or liquid bonding agent applied onto an outer surface of the rod 100 and bonded to the socket 300.

The bonding material 400 may be applied onto a portion of the rod body 110 on which the rod protrusions 120 are formed, and the bonding material 400 may also be applied onto surfaces of the rod protrusions 120. Alternatively, the bonding material 400 may be applied onto the rod body 110 between the plurality of rod protrusions 120.

The bonding material 400 is bonded to the outer surface of the rod 100 and an inner surface of the socket rod 320, such that the rod 100 and the socket 300 may be kept in a more securely coupled state.

The insert part 200 may be mounted inside the rod 100, and the bonding material 400 may be applied onto the outer surface of the rod 100. After the bonding material 400 is applied onto the outer surface of the rod 100, the rod 100 may be inserted and mounted in the socket rod 320 of the socket 300.

The rod 100 and the socket 300 may each be formed of a plastically deformable material. In the present disclosure, the rod 100 and the socket 300 may include an aluminum material. The rod 100 and the socket rod 320 of the socket 300 may include an aluminum material, such that the rod 100 and the socket 300 may be integrated by being plastically deformed in the same way by swaging processing by being pressed by the mechanism such as the swaging machine.

A process of assembling the stabilizer bar link according to the first embodiment of the present disclosure will be described.

The insert part 200 may be inserted and mounted inside the rod 100. The insert body 210 may be inserted and mounted in the hollow rod body 110. An excessive movement of the insert body 210 in the rod body 110 may be restricted by the insert stopper 220.

The bonding material 400 may be applied onto the outer surface of the rod 100. The rod 100 onto which the bonding material 400 is applied may be inserted and mounted inside the socket rod 320 of the socket 300.

The rod 100 and the socket 300 may be integrated as the socket rod 320 and the rod protrusions 120 are plastically deformed by swaging processing by the mechanism such as the swaging machine.

According to the stabilizer bar link according to the present disclosure, the rod 100 may be inserted and mounted in the socket 300, and the outer surface of the rod 100 may be plastically deformed, thereby improving the connectivity between the socket 300 and the rod 100.

In addition, according to the present disclosure, the insert part 200 may be mounted inside the rod 100, which may prevent the rod 100 from being excessively deformed when the rod 100 and the socket 300 are plastically deformed.

In addition, according to the present disclosure, the bonding material 400 may be applied onto the outer surface of the rod 100, such that the rod 100 and the socket 300 may be kept in a securely coupled state.

Figure 8:
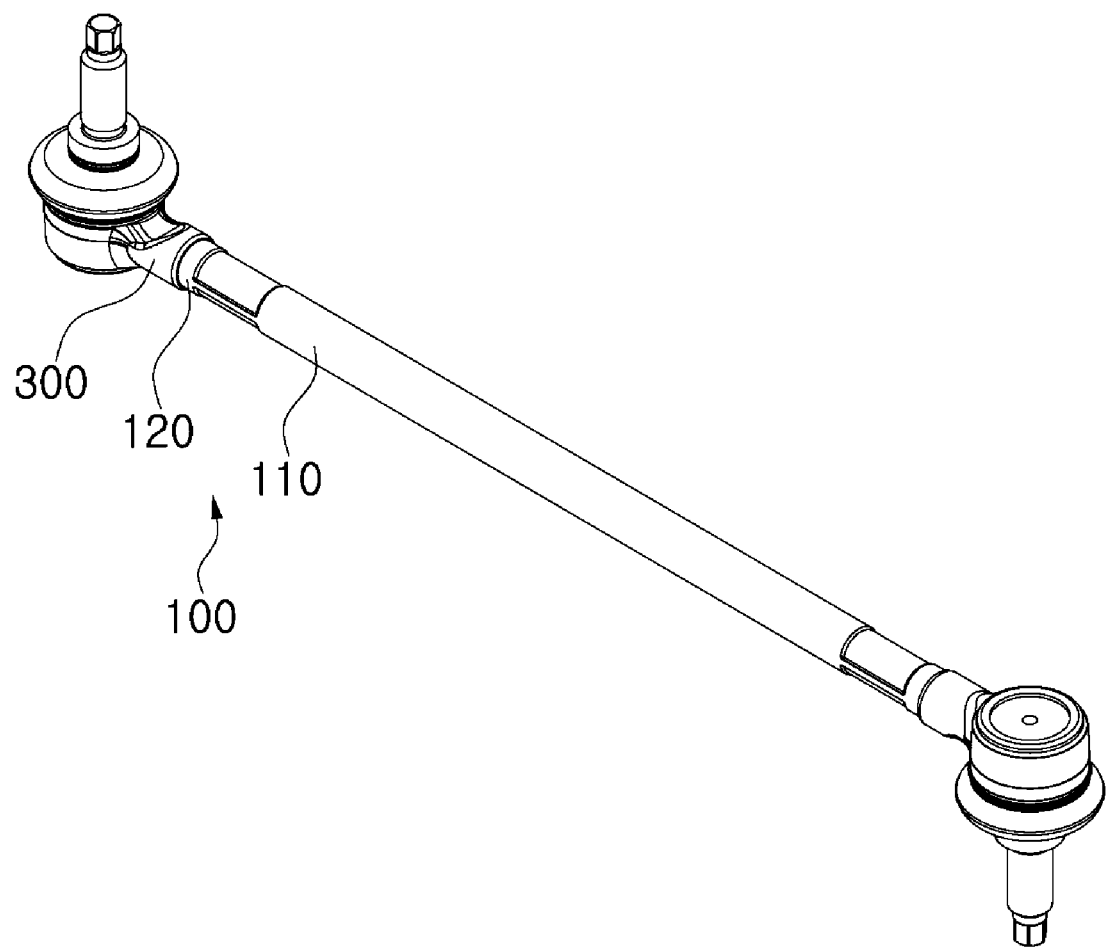
FIG. 8 is a perspective view schematically illustrating a stabilizer bar link according to a second embodiment of the present disclosure.
Figure 9:
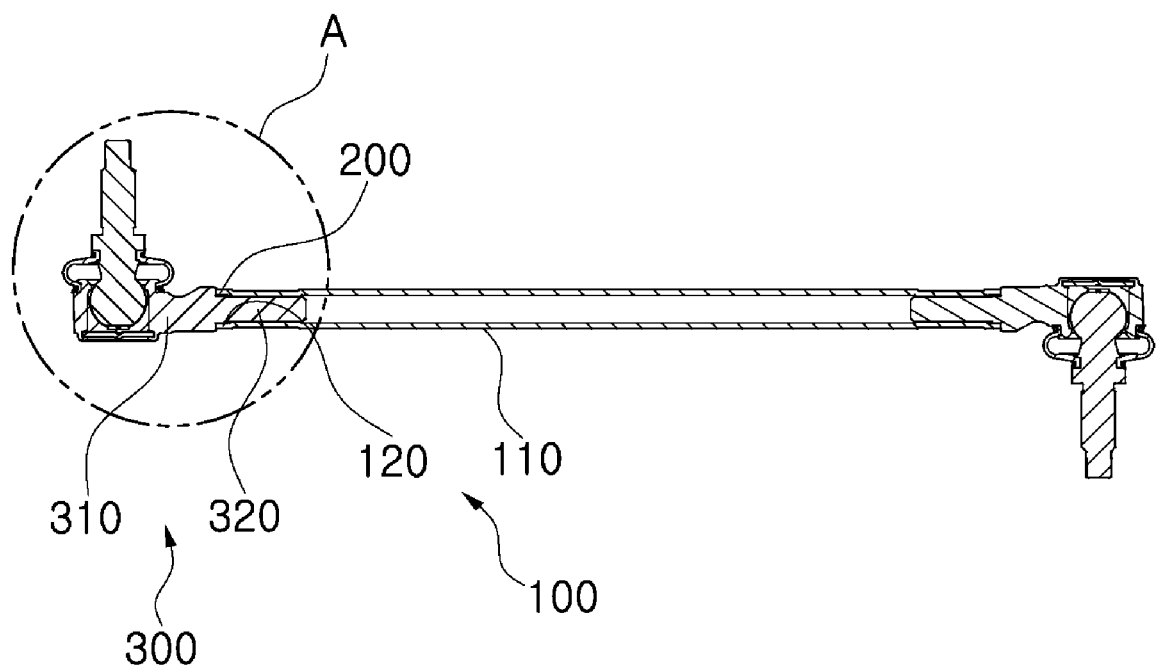
FIG. 9 is a cross-sectional view schematically illustrating the stabilizer bar link according to the second embodiment of the present disclosure.
Figure 10:
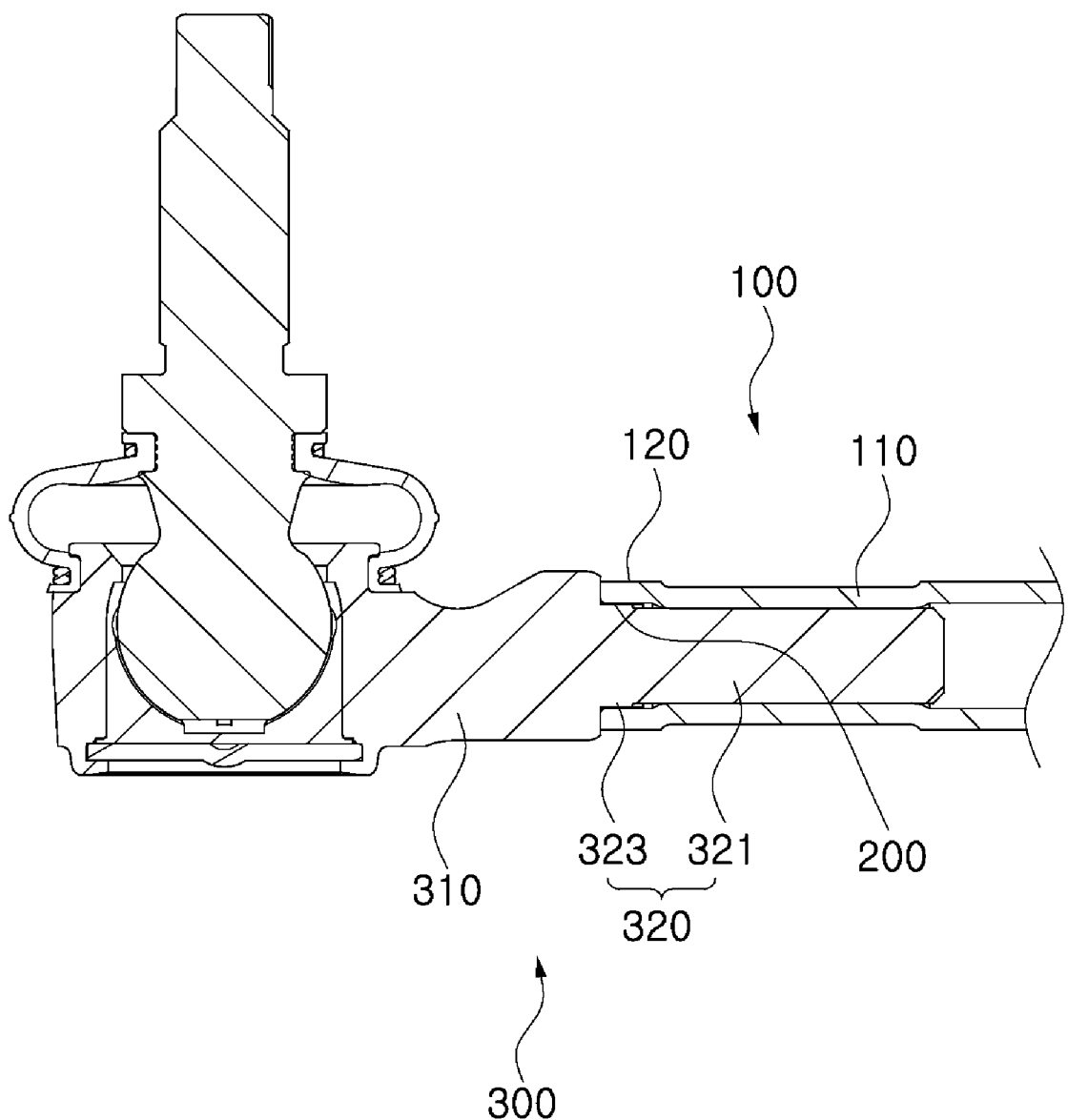
FIG. 10 is a partially enlarged cross-sectional view schematically illustrating part "A" in FIG. 9.
Figure 11:
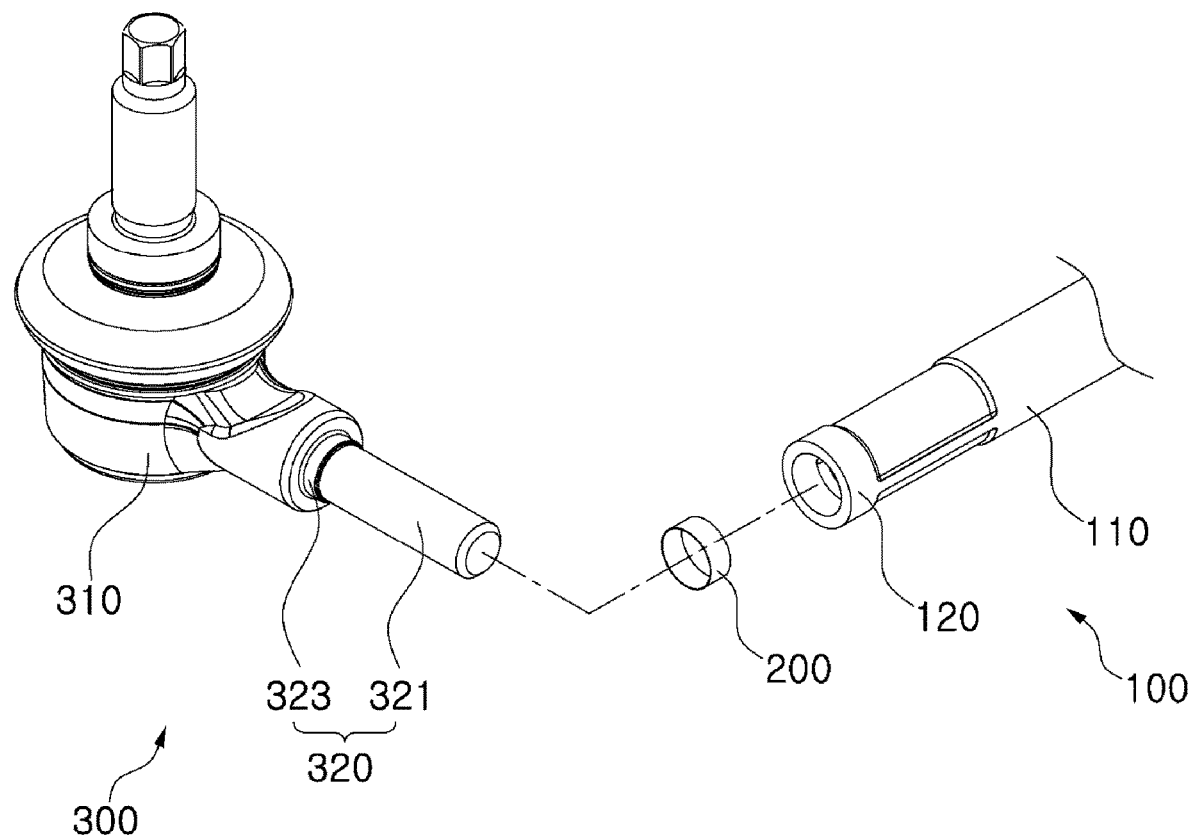
FIG. 11 is an assembled perspective view schematically illustrating the stabilizer bar link according to the second embodiment of the present disclosure.
Figure 12:
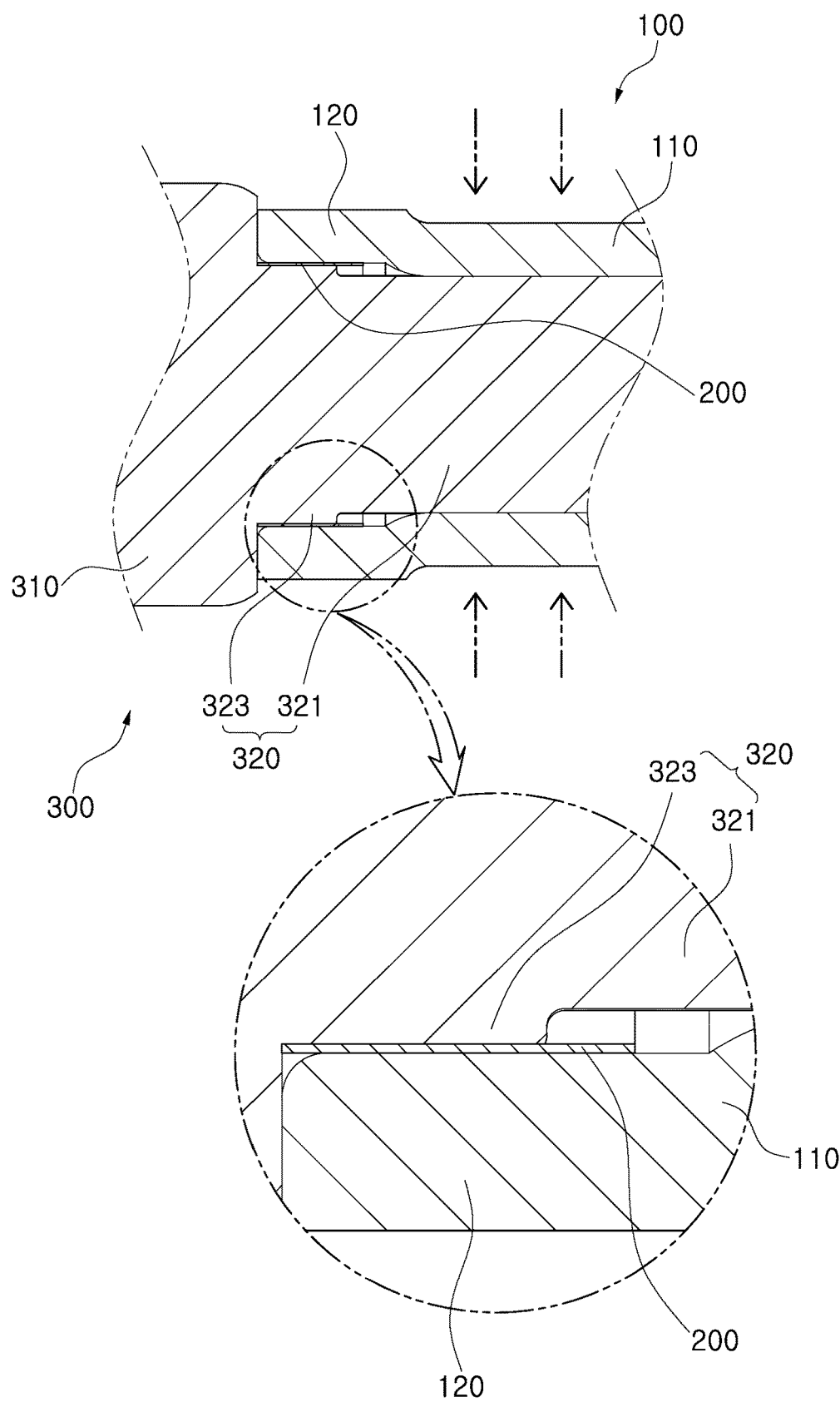
FIG. 12 is a partially enlarged cross-sectional view schematically illustrating a state in which a rod and a socket of the stabilizer bar link according to the second embodiment of the present disclosure are coupled.
Figure 13:
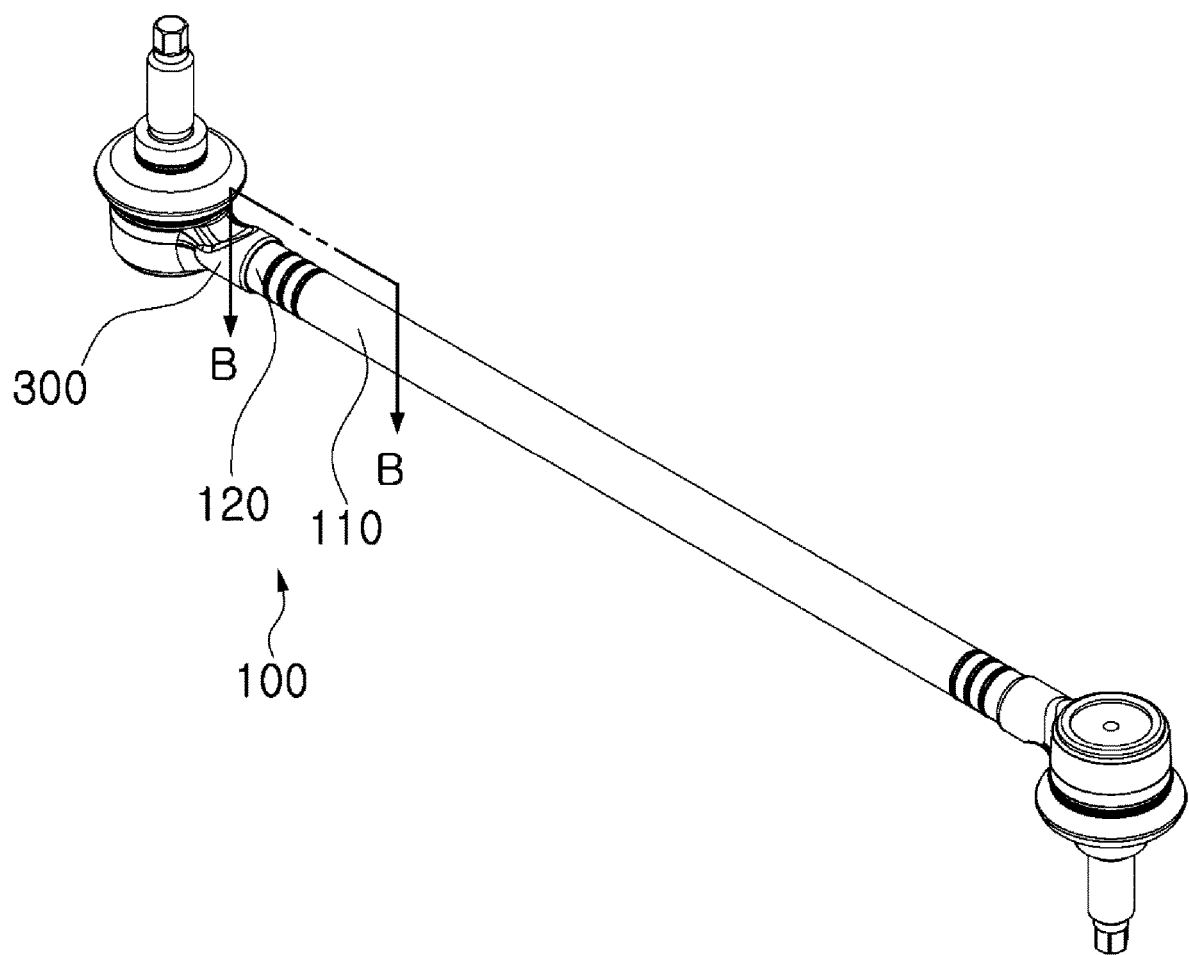
FIG. 13 is a perspective view schematically illustrating a state in which swaging processing has been performed on the stabilizer bar link according to the second embodiment of the present disclosure.
Figure 14:
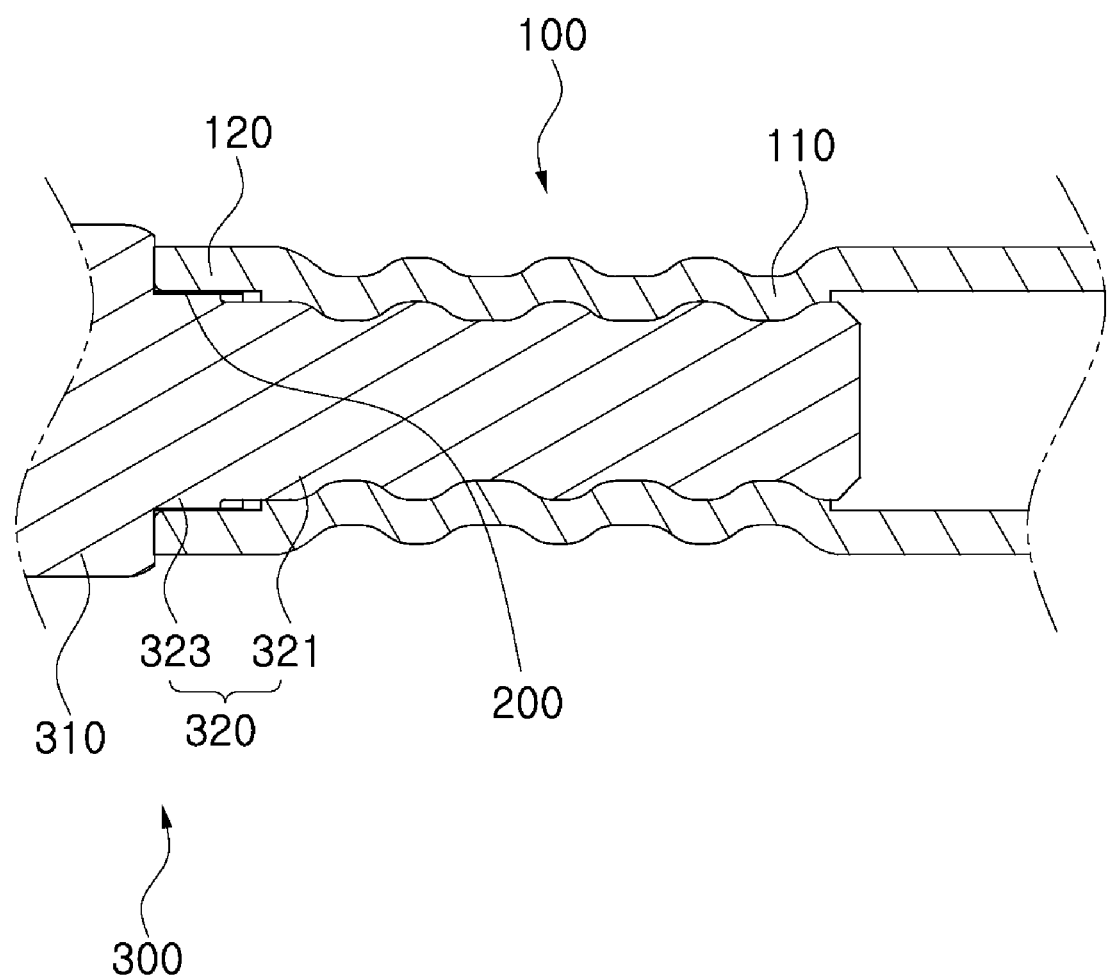
FIG. 14 is a cross-sectional view schematically illustrating a cross-section taken along line B-B in FIG. 13.

FIG. 8 is a perspective view schematically illustrating a stabilizer bar link according to a second embodiment of the present disclosure, FIG. 9 is a cross-sectional view schematically illustrating the stabilizer bar link according to the second embodiment of the present disclosure, FIG. 10 is a partially enlarged cross-sectional view schematically illustrating part "A" in FIG. 9, FIG. 11 is an assembled perspective view schematically illustrating the stabilizer bar link according to the second embodiment of the present disclosure, FIG. 12 is a partially enlarged cross-sectional view schematically illustrating a state in which a rod and a socket of the stabilizer bar link according to the second embodiment of the present disclosure are coupled, FIG. 13 is a perspective view schematically illustrating a state in which swaging processing has been performed on the stabilizer bar link according to the second embodiment of the present disclosure, and FIG. 14 is a cross-sectional view schematically illustrating a cross-section taken along line B-B in FIG. 13.

With reference to FIGS. 8 to 14, the stabilizer bar link according to the second embodiment of the present disclosure may include the rod 100, a sealing part 200, and the socket 300.

The rod 100 may be formed in a hollow pipe shape. With reference to FIGS. 8 and 9, the sockets 300 may be respectively mounted at two opposite ends of the rod 100. The rod 100 may include the rod body 110 and a rod stepped portion 120.

The rod body 110 may be formed in a hollow pipe shape into which the socket 300 is inserted and mounted. The sockets 300 may be respectively mounted at two opposite ends of the rod body 110. The rod body 110 may be formed in a hollow shape, such that the durability of the rod body 110 may be improved when the weight remains the same.

The rod stepped portion 120 is stepped on the rod body 110, and the scaling part 200 may be mounted on an inner surface of the rod stepped portion 120. An inner diameter of the rod stepped portion 120 may be larger than an inner diameter of the rod body 110.

The sealing part 200 may be mounted on the inner surface of the rod stepped portion 120. The sealing part 200 may be elastically deformed by a socket insertion portion 320 of the socket 300. The sealing part 200 may improve scalability between the rod stepped portion 120 of the rod 100 and the socket insertion portion 320 of the socket 300 while being elastically deformed. The sealing part 200 may be formed in a hollow pipe shape. The sealing part 200 may be formed in a ring shape.

The sealing part 200 may be mounted inside the rod 100 and include an elastically deformable material. The sealing part 200 may include rubber, silicone, plastic, or the like as the elastically deformable material. The sealing part 200 may be elastically deformed by being pressed by the socket insertion portion 320 of the socket 300. The sealing part 200 may be formed in a ring shape mounted inside the rod 100.

The sealing part 200 may be formed on an inner surface of the rod 100 by injection molding. The sealing part 200 may be integrated with the rod 100 by being formed on the inner surface of the rod stepped portion 120 of the rod 100 by injection molding.

The socket 300 may be inserted and mounted in the rod 100 and press the scaling part 200. After the socket 300 is inserted and mounted in the rod 100, the outer surface of the socket 300 is plastically deformed, such that the socket 300 may be coupled to the rod 100. The socket 300 may be integrated with the rod 100 by being plastically deformed and by being pressed by a pressing mechanism such as a swaging machine.

The socket 300 may include the socket body 310 and the socket insertion portion 320. The socket body 310 may have a rotatable ball stud, a bearing, and the like provided in an internal space thereof. Grease or the like may be applied between the ball stud and the bearing mounted in the socket body 310. The socket body 310 may be coupled, by means of a ball joint, to a knuckle, an upper arm, or a shock absorber coupled to a wheel of a vehicle.

The socket insertion portion 320 may protrude from the socket body 310 and be inserted into the rod body 110, and the socket insertion portion 320 may press the scaling part 200. As the socket insertion portion 320 presses the sealing part 200, the scaling part 200 is elastically deformed, such that a clearance between the socket insertion portion 320 and the rod stepped portion 120 may be removed, thereby improving the scalability.

The socket insertion portion 320 may include a socket rod 321 and a socket pressing portion 323. The socket rod 321 may protrude from the socket body 310 and be inserted into the rod body 110.

The socket pressing portion 323 may protrude from an outer surface of the socket rod 321 and press the sealing part 200. An outer diameter of the socket pressing portion 323 may be larger than an outer diameter of the socket rod 321. The socket pressing portion 323 may be stepped on the outer surface of the socket rod 321.

The outer diameter of the socket pressing portion 323 may be equal to the inner diameter of the rod stepped portion 120. Alternatively, the outer diameter of the socket pressing portion 323 may be smaller than the inner diameter of the rod stepped portion 120 within a range in which the socket pressing portion 323 may press the scaling part 200.

As the socket pressing portion 323 presses the sealing part 200, the sealing part 200 is elastically deformed, such that a clearance between the socket pressing portion 323 and the rod stepped portion 120 may be removed, thereby improving the scalability.

The rod 100 and the socket 300 may include a plastically deformable material which may be the same or different. In the present disclosure, the rod 100 and the socket 300 may include an aluminum material as the plastically deformable material. The rod 100 and the socket insertion portion 320 of the socket 300 may include an aluminum material, such that the rod 100 and the socket 300 may be integrated by being plastically deformed in the same way by swaging processing by being pressed by the mechanism such as the swaging machine.

With reference to FIGS. 13 and 14, the socket insertion portion 320 and the rod body 110 may be integrated by being plastically deformed by swaging processing. The socket insertion portion 320 and the rod body 110 may be formed in a wave shape by being plastically deformed by swaging processing. The socket insertion portion 320 and the rod body 110 may be integrated by being plastically deformed, thereby improving connectivity between the socket 300 and the rod 100.

A process of assembling the stabilizer bar link according to the second embodiment of the present disclosure will be described.

The sealing part 200 may be mounted on the rod stepped portion 120 of the rod 100 by injection molding.

The socket insertion portion 320 of the socket 300 may be inserted into the hollow rod 100. The socket pressing portion 323 of the socket insertion portion 320 may press the scaling part 200 mounted on the rod stepped portion 120 of the rod 100. The sealing part 200 may improve sealability between the socket pressing portion 323 and the rod stepped portion 120 by being elastically deformed by being pressed by the socket pressing portion 323.

In the state in which the socket insertion portion 320 is inserted and mounted in the rod body 110, the socket rod 321 and the rod body 110 are plastically deformed by swaging processing that presses the outer surface of the rod body 110 by means of the mechanism such as the swaging machine, such that the rod 100 and the socket 300 may be integrated.

According to the stabilizer bar link according to the present disclosure, the elastically deformable sealing part 200 is interposed between the socket 300 and the rod 100, and the sealing part 200 is elastically deformed by the socket 300, such that a clearance between the socket 300 and the rod 100 may be removed, thereby improving the sealability.

In addition, according to the present disclosure, the outer surface of the socket 300 is stepped, and the inner surface of the rod 100 is stepped, such that the occurrence of a clearance between the socket 300 and the rod 100 may be reduced.

While the specific embodiments of the present disclosure have been described above, the spirit and scope of the present disclosure are not limited to the specific embodiments, and may be variously modified and changed by those skilled in the art to which the present disclosure pertains without departing from the subject matter of the present disclosure disclosed in the claims.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A stabilizer bar link comprising:
a hollow rod;
an insert part mounted inside the rod; and
a socket into which the hollow rod is inserted and mounted, the socket having an outer surface coupled to the rod,
wherein:
the hollow rod and the socket are formed of a material that is plastically deformable and that includes aluminum, and
the insert part is made of a material having higher strength and hardness than a material of the hollow rod.

2. The stabilizer bar link of claim 1, wherein the hollow rod comprises:
a hollow rod body inserted into the socket; and
at least one rod protrusion annularly protruding from an outer surface of an end of the hollow rod body and coupled to the socket through plastic deformation.

3. The stabilizer bar link of claim 2, wherein the at least one rod protrusion includes a plurality of rod protrusions protruding from the outer surface of the end of the hollow rod body.

4. The stabilizer bar link of claim 2, wherein the socket and the at least one rod protrusion are coupled by a swaging processing.

5. The stabilizer bar link of claim 1, wherein the insert part comprises:
an insert body mounted inside the hollow rod; and
an insert stopper formed at an end of the insert body that is larger than an inner diameter of the hollow rod.

6. The stabilizer bar link of claim 1, further comprising:
a bonding material applied to an outer surface of the hollow rod and bonded to the socket.

* * * * *